Feb. 10, 1970  A. L. KOHL ET AL  3,494,469
REVERSE OSMOSIS SYSTEM

Filed Jan. 2, 1968  2 Sheets-Sheet 1

INVENTORS
ARTHUR L. KOHL
FREDERICK W. POUCHER JR.
BY
Donald J. Ellingsberg

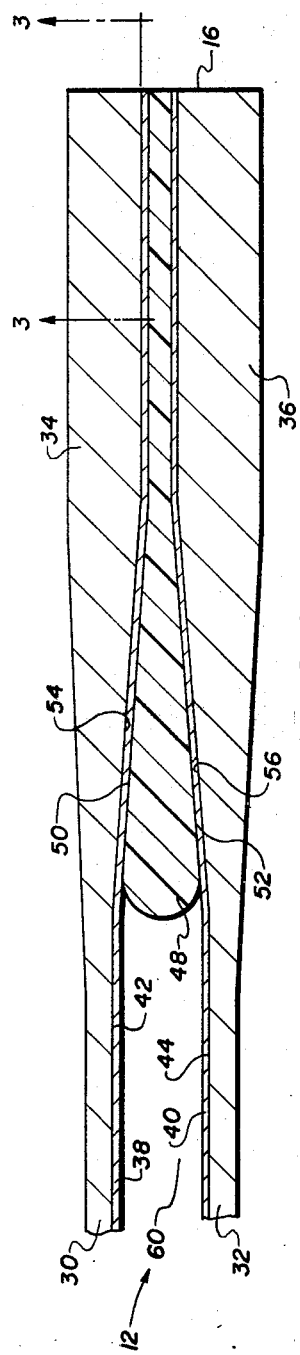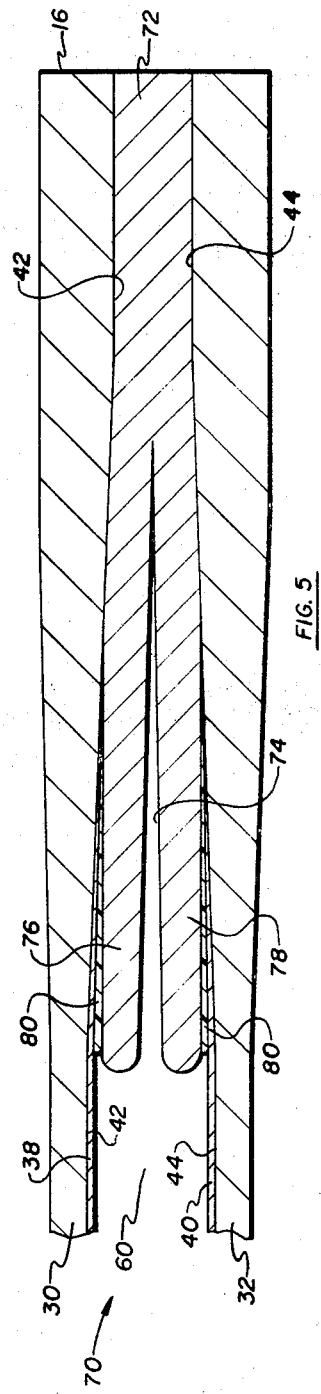

United States Patent Office 3,494,469
Patented Feb. 10, 1970

3,494,469
REVERSE OSMOSIS SYSTEM
Arthur L. Kohl and Frederick W. Poucher, Jr., Woodland Hills, Calif., assignors to North American Rockwell Corporation
Filed Jan. 2, 1968, Ser. No. 695,136
Int. Cl. B01d *13/00*
U.S. Cl. 210—321         8 Claims

ABSTRACT OF THE DISCLOSURE

A reverse osmosis system that produces pure water from saline water by using tubular reverse osmosis membranes and backing plates assembled and retained in a stacked unit.

Background of the invention

The need for water in the world is basic. And to satisfy this need, appropriate emphasis is being placed on developing processes that will economically produce pure water from sea water, or from other saline or brackish waters.

One process that produces pure water is the reverse osmosis process. When saline water and pure water are separated by a semi-permeable membrane, osmosis creates a flow of pure water through the membrane into the saline water. If the saline water is subjected to a pressure greater than the natural osmotic force, the process is reversed and pure water in the saline water is forced through the membrane to the pure water side, leaving concentrated salts behind.

Desalination systems using the reverse osmosis process can be economical for saline water conversion because of simplicity and the near approach to an ideal thermodynamic system. Yet, an analysis of a reverse osmosis system indicates that the membranes, membrane backup materials, and pressure containment structures represent major costs. Therefore, increased emphasis must be placed on the total system design for maximum economy.

Objects of the invention

Accordingly, it is an object of the invention to provide a new and improved reverse osmosis system.

Another object of the invention is to provide a new and improved reverse osmosis system having a maximum area of useful membrane surface per unit volume of high pressure containment.

A further object of the invention is to provide a new and improved membrane tube and backup structure for a reverse osmosis system.

An additional object of the invention is to provide a backup structure for a reverse osmosis system that reduces the distance that product fluid must travel and reduces pressure losses.

Yet another object of the invention is to provide a new and improved seal insert for a reverse osmosis system.

It is also an object of the invention to provide low-cost sealing methods for the reverse osmosis membranes.

Another object of the invention is to provide a system which does not require internal product water collection channels thereby permitting extremely close spacing of adjacent membrane tubes.

Summary of the invention

Briefly, in accordance with the invention, a reverse osmosis system is provided having a generally tubular membrane means that cooperates with a suitable backing and restraining means so that a pressurized feed fluid introduced into the system is constrained to flow through an internal fluid volume defined by the tubular membrane means. A fluid flow path means cooperates with the backing means so that a product fluid which passes through the membrane means from the feed fluid continues along the path means and discharges from the system.

While the specification concludes with claims particularly pointing out and distinctly claiming the subject matter which may be regarded as the invention, the organization and method of operation, together with further objects, features, and the attending advantages thereof may best be understood when the following description is read in connection with the accompanying drawings.

Brief description of the drawings

FIGURE 2 is an enlarged sectional view, partly broken away, of one form of structure used in the reverse osmosis system of FIGURE 1;

FIGURE 3 is an enlarged sectional view of the backup plate of FIGURE 2 along the line 3—3;

FIGURE 4 is an enlarged sectional view along the line 4—4 of FIGURE 3;

FIGURE 5 is an enlarged sectional view, partly broken away, of another form of structure that can be used in the reverse osmosis system as shown by FIGURE 1.

Description of the invention

Figure 1:
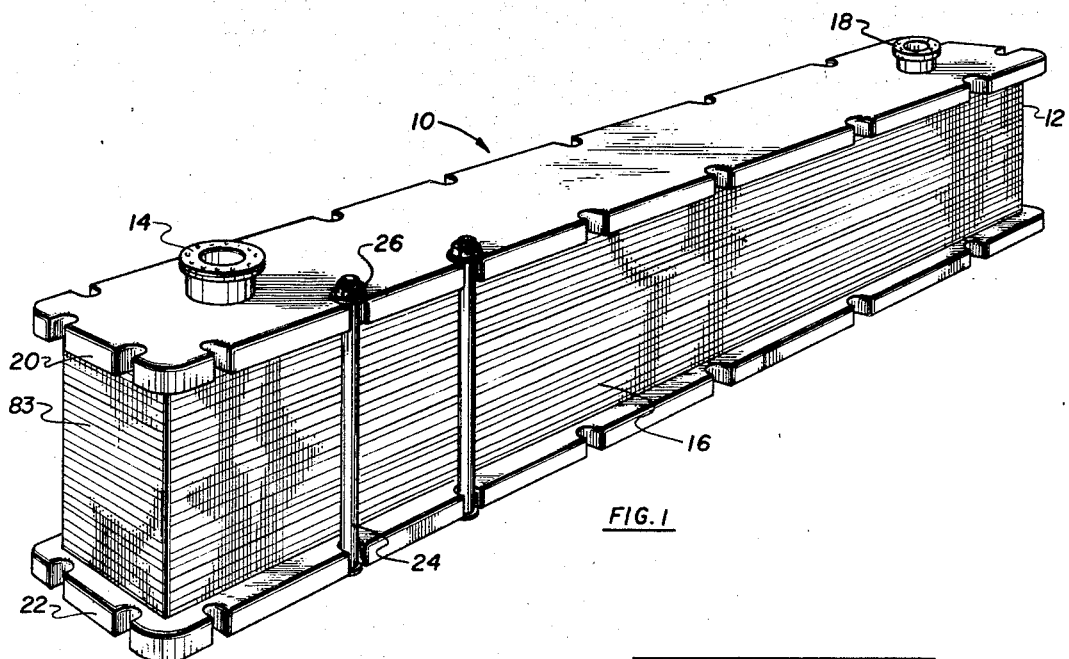
FIGURE 1 is a perspective view of one form of reverse osmosis system formed in accordance with the invention.

In FIGURE 1, a reverse osmosis system 10 has a plurality of similar backup plates and reverse osmosis membranes that are generally arranged in a stacked unit such as unit 12. A pressurized feed fluid, such as prefiltered sea water or other saline water or brackish water, is introduced from a feed fluid source (not shown) to the stacked unit through a feed fluid inlet 14. A product fluid, such as pure water, discharges at the outer edges 16 of the stacked unit 12. Since the feed fluid contains salts that remain dissolved in the form of a more concentrated solution after the removal of pure water, the remaining pressurized feed fluid or brine passes from the reverse osmosis system 10 through a brine outlet 18 to a brine collection system (not shown).

The reverse osmosis system 10 in FIGURE 1 has cover plates 20 and 22 that are spaced apart by the stacked unit 12. The cover plates 20 and 22 restrain the stacked unit from expanding due to the internal pressurization by suitable tension means such as tension bolts 24 that are fastened between the cover plates and secured by conventional nuts 26. It is contemplated that the cover plates can be restrained by other tension means such as cables, springs, clamps, or the like. The tension means also serves to provide a compressive load on all edges of the stacked unit 12, such as outer edges 16, to aid in maintaining sealing arrangements as descibed hereinafter.

Referring to FIGURE 2, a portion of a "membrane tube" from the stacked unit 12 of FIGURE 1 is shown. Adjacent but spaced apart backing means, such as backing plates 30 and 32, have thickened outer portions 34 and 36, respectively, that develop outwardly diverging clamping surfaces adjacent the outer edge 16 of the stacked unit 12. Reverse osmosis membranes 38 and 40 are positioned along the opposing surfaces 42 and 44 of the respective backing plates 30 and 32 with a suitable sealant means such as sealant plug 48, which is preferably a chemical bonding sealant such as an epoxy polymer or the like, placed between the reverse osmosis membranes 38 and 40 as illustrated by FIGURE 2. The reverse osmosis membranes 38 and 40 can be formed from a cellulose acetate-acetone-formamide solution such as taught by U.S. Patent No. 3,133,132, although it is contemplated that other suitable membranes or membrane tubes can be used.

Inclined surfaces 50 and 52 of sealant plug 48 as shown by FIGURE 2 correspond to and engage with the respective inclined surfaces 54 and 56 of the backing plate outer portions 34 and 36. The reverse osmosis membranes and spaced-apart sealant plugs form a generally flattened reverse osmosis membrane tube that defines a fluid volume 60. The fluid volume 60 is preferably a longitudinally extending fluid passage in fluid communication with the feed fluid inlet 14 and brine outlet 18.

Then a pressurized feed fluid is introduced through the feed fluid inlet 14 to the fluid volume 60, the feed fluid exerts a force against the sealant plug 48 generally in a lateral direction, i.e. toward the outer edge 16, which tends to move the plug laterally. Because of the wedge shape of the plug 48, this lateral motion creates an increased pressure at the membrane plug interface and improves the sealing characteristics. The lateral movement of the sealant plug 48, however, is insufficient to physically tear or otherwise rupture the reverse osmosis membranes 38 and 40. Thus, the integrity of each membrane tube is insured during operation of the improved reverse osmosis system of my invention.

When the pressurized feed fluid is introduced through the feed fluid inlet 14 to the similar volumes 60 defined by adjacent membranes in the stacked unit 12, a product fluid, e.g. pure water, is forced from the feed fluid through the reverse osmosis membranes such as membranes 38 and 40 of FIGURE 2 to the surfaces 42 and 44 of the respective backing plates 30 and 32, and passes in a lateral direction, i.e. toward the outer edge 16, along a product fluid flow path means such as a plurality of grooves 62 in the surfaces 42 and 44, particularly as shown by FIGURES 3 and 4. The pure water is collected at the outer edge 16 of the reverse osmosis system 10 in a conventional manner, for example, by suitable trays. It is contemplated that under certain operating conditions, the grooves could be eliminated and an intermediate backing layer used as the product fluid flow path. The backing layer would be sandwiched between a reverse osmosis membrane and its adjacent packing plate; for example, between reverse osmosis membrane 38 and the surface 42 of backing plate 30. The contemplated backing layer can be a suitable porous sheet such as filter paper, nylon cloth, nylon parchment, or the like.

FIGURE 5 shows a portion of another embodiment of the stacked unit 12 where like parts as have been described will have the same reference numerals. A bifurcated wedge insert 72 is positioned between the reverse osmosis membranes 38 and 40 that cooperate with the respective backing plates 30 and 32. The wedge insert 72 has an inwardly directed bifurcation 74 with related branches 76 and 78. A chemical bonding sealant 80, which can be epoxy cement or the like, bonds the branches 76 and 78 of the wedge insert 72 to the respective reverse osmosis membranes 38 and 40.

In the embodiment of FIGURE 5, when the pressurized feed fluid is introduced into the fluid volume 60, the fluid exerts a force that flexes the branches 76 and 78 and opens the bifurcation 74 which enhances the seal made by sealant 80 between the branches 76 and 78 and the respective membranes 38 and 40. However, this action does not rupture or otherwise destroy the integrity of the reverse osmosis membranes.

A product fluid is forced from the pressurized feed fluid and passes to the unit outer edge in a manner similar to that previously described and illustrated by FIGURE 2.

Figure 6:
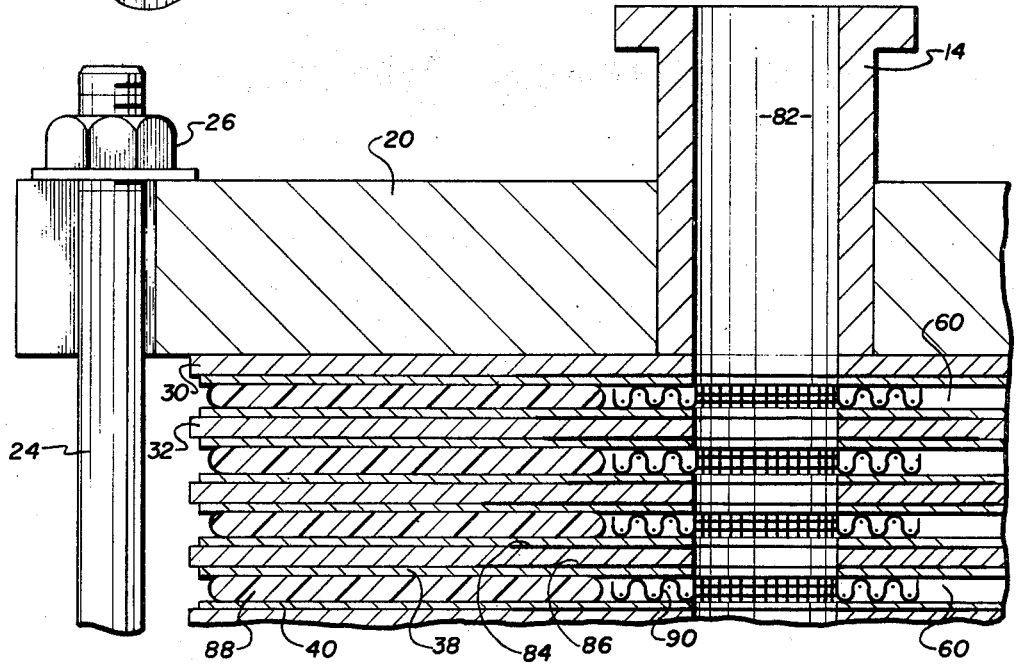
FIGURE 6 is an enlarged sectional view, partly broken away, of the reverse osmosis system as shown by FIGURE 1.

Referring now to FIGURE 6, the stacked unit 12 is formed from a plurality of reverse osmosis membranes and backing plates assembled as shown by FIGURES 2 or 5. The feed fluid volumes 60 in the reverse osmosis system 10 are placed in fluid communication with the feed fluid inlet 14 by means of a feed fluid inlet channel 82. The backing plates and membranes, such as backing plates 30 and 32, and membranes 38 and 40, are individually bonded together at the ends of the stacked unit (such as end 83 as shown by FIGURE 1) by a suitable chemical bonding sealant such as epoxy cement or the like. The chemical bonding sealant is used at the ends of the stacked unit to bond the backing plates to the reverse osmosis membranes by means of bond regions, such as bond region 84 and 86. Similar plugs of bonding sealant 88 complete the end sealing arrangement by bonding together the reverse osmosis membranes, such as membranes 38 and 40. A porous spacer means, such as porous washer 90, is positioned between adjacent membranes in the region of the feed inlet channel 82 to maintain the fluid volumes 60 in an open configuration, and to facilitate bonding during assembly of the membranes and backing plates. A feed fluid outlet channel, not shown but similar to feed fluid inlet channel 82, permits the concentrated feed fluid or brine to pass from the plurality of feed fluid volumes 60 in the stacked unit 12 to brine outlet 18. It is contemplated that under certain operating conditions the stacked unit 12 can be further reinforced by optional end plates (not shown) which would be positioned between the cover plates 20 and 22 at the end regions of the stacked unit such as end region 83 of the stacked unit (see FIGURE 1).

Operatively, a pressurized feed fluid enters the reverse osmosis system 10 through the feed fluid inlet 14 and passes through the feed fluid inlet channel 82 to the similar fluid volumes 60 defined by the "tubular" arrangement of the reverse osmosis membranes, such as membranes 38 and 40. A product fluid, e.g. pure water, is forced from the feed fluid through the reverse osmosis membranes 38 and 40 and passes along the product fluid flow path means such as similar grooves 62 in the backing plates. The pure water passes to the outer edge 16 of the system where it is collected in a conventional manner. The remaining feed fluid or brine passes from the system through brine outlet 18.

The lateral distance that a product fluid travels in reaching the outer edge 16 of the stacked unit 12 is substantially minimized in the reverse osmosis system 10 of my invention. This avoids the excessive pressure losses that are experienced by product fluid flow in backup structures of prior art reverse osmosis systems. The product fluid output can be increased without an increase in lateral pressure losses by lengthening the individual membrane tubes while maintaining the same tube widths.

As will be evidenced from the foregoing description certain aspects of the invention are not limited to the particular details of construction as illustrated, and it is contemplated that other modifications and applications will occur to those skilled in the art.

We claim:
1. A reverse osmosis system comprising:
(a) first and second spaced-apart membrane means defining outer edge portions and further defining an internal fluid volume having an inlet means and an outlet means so that a pressurized first fluid which is introduced through said inlet means passes into said fluid volume where a portion of said first fluid passes as a second fluid in a predetermined direction through said membrane means,
(b) backing means cooperating with and spaced apart by said membrane means and having outer edge portions developing outwardly diverging clamping surfaces generally adjacent said membrane means outer edge portions,
(c) fluid flow path means for said second fluid cooperating with said backing means and said membrane means so that said second fluid passes along said path means and discharges from the reverse osmosis system, and
(d) generally wedge-shaped plug insert means positioned between said first and second membrane means outer edge portions cooperating with said adjacent outwardly diverging clamping surfaces and maintaining said adjacent outer edge portions of said backing means and said membrane means in a sealing relationship so that said first fluid is constrained to pass from said fluid volume through said outlet means.

2. The reverse osmosis system of claim 1 in which said plug insert means is a bifurcated wedge having bifurcation branches cooperating with and in a sealing relationship with said membrane means.

3. The reverse osmosis system of claim 1 in which said bifurcation branches are maintained in said sealing relationship with adjacent membrane means by a suitable chemical bonding sealant.

4. The reverse osmosis system of claim 1 in which said flow path means is a plurality of grooves suitably formed in said outer edge portions of said backing means.

5. The reverse osmosis system of claim 1 in which said fluid flow path means is an intermediate backing layer positioned between said cooperating membrane means and backing means.

6. The reverse osmosis system of cliam 1 in which said restraining means comprises:
   (a) at least first and second cover plate means spaced apart by said membrane means and said backing means, and
   (b) tension means cooperating with said spaced-apart cover plate means so that said sealing relationship is maintained.

7. The reverse osmosis system of claim 1 in which said inlet and outlet means include respective inlet and outlet channel means in fluid communication with said internal fluid volume.

8. The reverse osmosis system of claim 7 in which suitable porous spacer means generally define said inlet and outlet channel means and further maintain said tubular membrane means in a spaced-apart relationship adjacent said inlet and outlet channel means.

References Cited

UNITED STATES PATENTS

| 1,331,732 | 2/1920 | Wait | 210—321 X |
|---|---|---|---|
| 3,398,833 | 8/1968 | Marks et al. | 210—321 |
| 3,398,834 | 8/1968 | Nuttall et al. | 210—321 |

OTHER REFERENCES

Keilin et al.: "Design Criteria for Reverse Osmosis Desalination Plants," presented at the First International Symposium on Water Desalination, held Oct. 3-9, 1965, in Washington, D.C. 1–9 and 12–15 relied on.

REUBEN FRIEDMAN, Primary Examiner

FRANK A. SPEAR, JR., Assistant Examiner

U.S. Cl. X.R.

210—346, 433